(12) United States Patent
Takahashi et al.

(10) Patent No.: US 6,749,956 B1
(45) Date of Patent: Jun. 15, 2004

(54) MAGNETIC RECORDING MEDIUM (75) Inventors: Migaku Takahashi, Miyagi-ken (JP);
Akira Kikuchi, Miyagi-ken (JP)

(73) Assignee: Migaku Takahashi (JP)

( * ) Notice: Subject to any disclaimer, the term of this patent is extended or adjusted under 35 U.S.C. 154(b) by 0 days.

(21) Appl. No.: 09/402,017

(22) PCT Filed: Mar. 28, 1997

(86) PCT No.: PCT/JP97/01092

§ 371 (c)(1),
(2), (4) Date: Nov. 26, 1999

(87) PCT Pub. No.: WO98/44491

PCT Pub. Date: Oct. 8, 1998

(51) Int. Cl.$^7$ .............................. G11B 5/66; G11B 5/70
(52) U.S. Cl. .............................. 428/694 TS; 694/336; 694/900
(58) Field of Search ....................... 428/694 T, 694 SG, 428/900, 694 TS, 336; 360/313, 317, 318

(56) References Cited

U.S. PATENT DOCUMENTS 5,822,159 A * 10/1998 Fukuyama et al. ......... 360/113
5,853,847 A * 12/1998 Takahashi ................... 428/141

FOREIGN PATENT DOCUMENTS

WO      WO 9503603    *  2/1995

OTHER PUBLICATIONS

Migaku Takahashi "Control of Microstructure and Magnetic Properties in Thin Film Disk by an Ultra Clean Sputtering Process" Materials Chemistry and Physics 51 (1997) pp. 15–22.

Migaku Takahashi, et al. "Magnetic Microstructure and Media Noise of Thin Film Media Fabricated under Ultra Clean Sputtering Process" Journal of the Magnetics Society of Japan vol. 21, Supplement, No. S2 (1997), pp. 499–504.

* cited by examiner

*Primary Examiner*—Holly Rickman
(74) *Attorney, Agent, or Firm*—Randall J. Knuth (57) ABSTRACT

A magnetic recording medium having a high normalized coercive force of a ferromagnetic metal layer and excellent S/N ration and adaptable to high density recording. The magnetic recording medium comprises a substrate body and a Co-based ferromagnetic metal layer formed thereon via a metallic underlying layer. The oxygen concentrations in the metallic underlying layer and in the ferromagnetic metal layer are not larger that 100 wt ppm. Magnetic in version is used for the recording. The value of $4\Pi Ms/H_k^{grain}$ is the saturation magnetization of the ferromagnetic metal layer and $H_k^{grain}$ is the anisotropic magnetic field of the individual crystalline particles constituting the ferromagnetic metal layer is 1 or less.

7 Claims, 8 Drawing Sheets

MAGNETIC RECORDING MEDIUM

BACKGROUND OF THE INVENTION

1. Field of the Invention

The present invention relates to a magnetic recording medium, and, in particular, to a magnetic recording medium formed under an ultra clean atmosphere, i.e., a high density magnetic recording medium utilizing magnetization reversal and having a ferromagnetic metal layer whose oxygen concentration is 100 wt ppm or less, wherein normalized coercivity ($Hc/H_k^{grain}$: Hc=coercivity, $H_k^{grain}$=anisotropic magnetic field) is high, and is superior in a medium S/N at the time of recording and reproduction. The magnetic recording medium of the present invention can be suitably applied to a hard disk, a floppy disk, a magnetic tape, and the like.

2. Description of the Related Art

As the conventional magnetic recording medium and its manufacturing method, is known the following technique.

Figure 8:
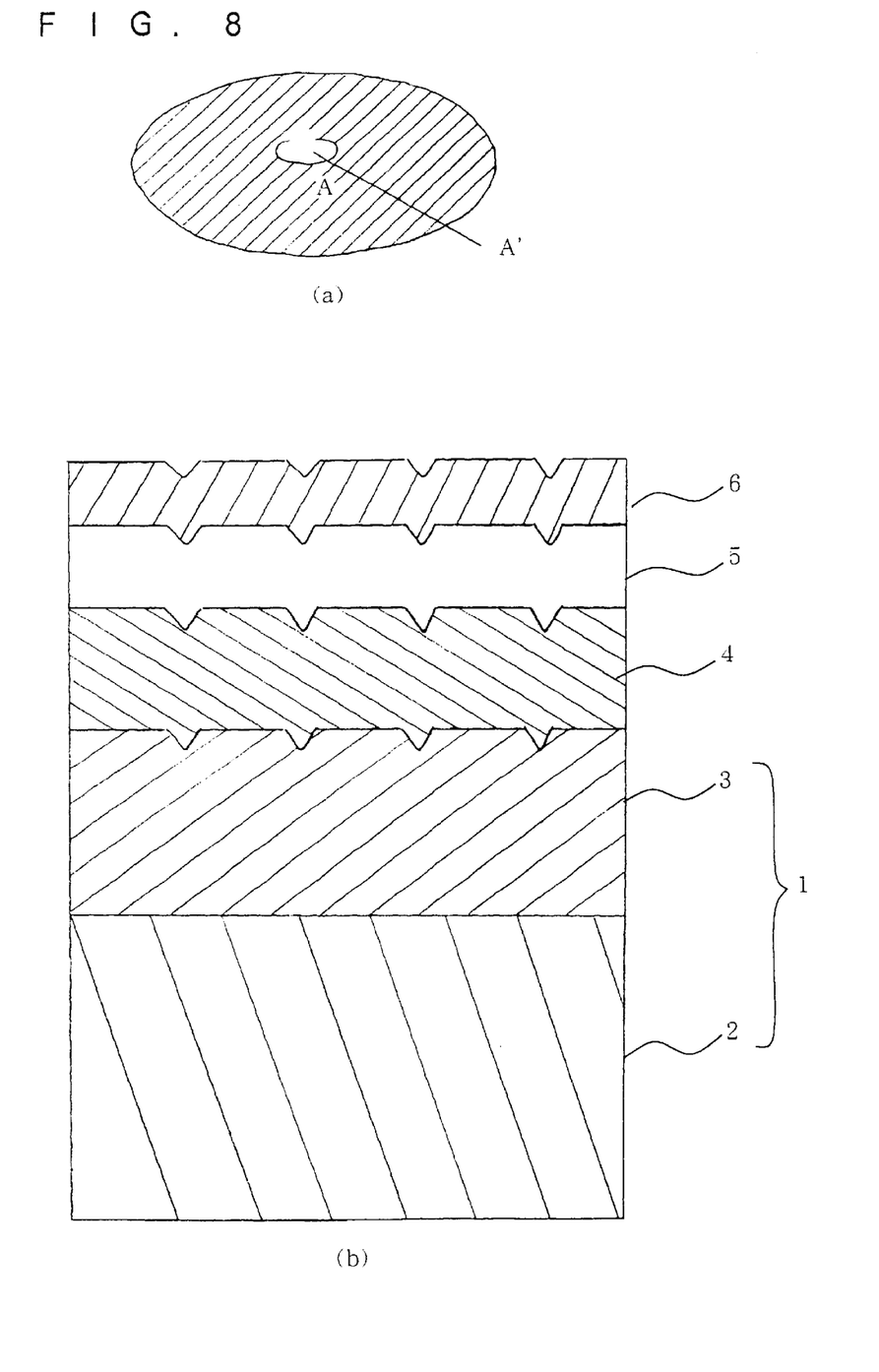
FIG. 8 is a schematic cross section showing layer structure of a magnetic recording medium.

FIG. 8 is a schematic view illustrating a hard disk as an example of a magnetic recording medium. In FIG. 8(a) is a perspective view of the whole magnetic recording medium, and FIG. 8(b) is a cross section along the line A–A' in FIG. 8(a).

As a substrate body 1, is used one in which a non-magnetic (Ni—P) layer 3 is provided on a surface of an Al substrate 2. On this substrate body 1, are laminated a Cr underlying layer 4, a ferromagnetic metal layer 4, a ferromagnetic metal layer 4, and a protective layer 6.

The non-magnetic (Ni—P) layer 3 is formed by planting or sputtering, on the disk-shaped Al substrate 2 of 89 mm(3.5 inches) in diameter and 1.27 mm (50 mil) in thickness, to form the substrate body 1. Further, on the surface of the non-magnetic (Ni—P) layer 3, are provided concentric scratches (hereinafter, referred to as texture) by a mechanical grinding process. Generally, surface roughness of the non-magnetic (Ni—P) layer 3, i.e., a center line average height Ra measured in the radial direction is 5 nm–15 nm. Further, the Cr underlying layer 4 and the ferromagnetic metal layer 5 (generally, a magnetic film of Co alloy family) are formed on the surface of the above-mentioned substrate body 1 by sputtering, and, lastly, the protective layer 6 comprising carbon and the like is formed by sputtering to protect the surface of the ferromagnetic metal layer 5. Typical thicknesses of respective layers are 5 $\mu$m–15 $\mu$m for the non-magnetic (Ni—P) layer 3, 50 nm–150 nm for the Cr underlying layer 4, 30 nm–100 nm for the ferromagnetic layer 5, and 20 nm–50nm for the protective layer 6.

The conventional magnetic recording medium having the above-described layer structure has been manufactured under the condition that back pressure of the deposition chamber is a the level of 10-7 Torr before the sputter deposition and impurity concentration of Ar gas used for film formation is 1 ppm or more.

In the magnetic recording medium obtained by the above-described manufacturing method, and particularly in the case of a ferromagnetic metal layer 5 containing Ta element (for example, a CoCrTa alloy magnetic film), it is reported by Nakai et al. that, between crystal grains forming the ferromagnetic metal layer, exists a grain boundary layer of amorphous structure, and that this grain boundary layer has non-magnetic alloy composition (J. Nakai, E. Kusumoto, M. Kuwabara, T. Miyamoto, M. R. Visokay, K. Yoshikawa and K. Itayama, "Relation Between Microstructure of Grain Boundary and the Integranular Exchange in CoCrTa Thin Film for Longitudinal Recording Media:, IEEE Trans. Magn., vol. 30, No. 6, pp. 3969, 1994). However, in the case of a ferromagnetic metal layer that does not contain Ta element (for example, a CoNiCr or CoCrPt alloy magnetic film), the above-mentioned grain boundary layer has not been found. Further, the above report describes that, when a ferromagnetic metal layer contains Ta element, a normalized coercivity (expressed as $Hc/H_k^{grain}$) of the magnetic recording medium is as large as 0.3 or more, and when a ferromagnetic metal layer does not contain Ta element, its value is less than 0.3.

The above-mentioned normalized coercivity ($Hc/H_k^{grain}$) of the ferromagnetic metal layer is a value obtained by dividing a coercivity Hc by an anisotropic magnetic field $H_k^{grain}$ of a crystal grain, and express a degree of increase of magnetic isolation of the crystal grain. Namely, when normalized coercivity of a ferromagnetic metal layer is high, it means the magnetic interaction between respective crystal grains constituting the ferromagnetic metal layer decreases, and high coercivity can be realized.

Further, an international patent application PCT/JP94/01184 discloses a technique relating to a cheap high-density recording medium whose coercivity is increased without using an expensive ferromagnetic metal layer, and its manufacturing method. According to PCT/JP94/01184, regarding a magnetic recording medium which has a ferromagnetic metal layer formed on a surface of a substrate body via a metal underlaying layer and utilizes magnetization reversal, Ar has whose impurity concentration is 10 ppb or less is used for film formation, so that oxygen concentration of the metal underlying layer and/or ferromagnetic metal layer is made 100 wt ppm or less. Further, it is also reported that, the coercivity is further increased when Ar gas of 10 ppb or less impurity concentration is used in a cleaning process by high frequency sputtering on the surface of the above-mentioned substrate body to remove the surface of the substrate body by 0.2 nm–1 nm, before forming the above-mentioned metal underlying layer. Further, in this report, it is described that there is a correlation between a normalized coercivity of a magnetic recording medium and its medium noise, and, in order to obtain a low noise medium, its normalized coercivity should be more than or equal to 0.3 and less than 0.5.

Further, an international patent application PCT/JP95/00380 discloses a magnetic recoding medium and its manufacturing method, in which, when oxygen concentration of a ferromagnetic metal layer consisting of CoNiCr or CoCrPt is 100 wt ppm or less, a grain boundary layer of amorphous structure can be formed between crystal grains constituting the ferromagnetic metal layer, and, as a result, an S/N of electromagnetic transduction characteristics is high, and a stable coercivity can be obtained in mass production.

However, in the magnetic recording medium formed under the ultra clean atmosphere, i.e., the magnetic recording medium utilizing magnetization reversal and having a ferromagnetic metal layer whose oxygen concentration is 100 wt ppm or less, it is still obscure what are conditions in which a high normalized coercivity ($Hc/H_k^{grain}$) of, for example, 0.3 or more is obtained stably without depending on the crystal grain diameter of a ferromagnetic metal layer, and conditions of grain diameters of the crystal grains constituting the ferromagnetic metal layer for realizing a high medium S/N. It has been desired to elucidate these relations, in order to develop a magnetic recording medium adaptable to promotion of high recording density.

An object of the present invention is to provide a magnetic recording medium adaptable to promotion of high recording density, having a high normalized coercivity of the ferromagnetic metal layer and, at the same time, a superior medium S/N.

SUMMARY OF THE INVENTION

The present invention provides a magnetic recording medium utilizing magnetization reversal, and comprises a Co-based ferromagnetic metal layer formed on a base body via a metal underlying layer with surface roughness of the base body being less than 1 nm in terms of a center line average height Ra, and oxygen concentration of said metal underlying layer and said ferromagnetic layer being 10 wt ppm or less.

When saturation magnetization of the ferromagnetic metal layer is expressed by Ms, and an anisotropic magnetic field of individual crystal grains constituting the ferromagnetic metal layer is expressed by $H_k^{grain}$, then $4\Pi Ms/H_k^{grain}$ is 1 or less.

In the magnetic recording medium of the present invention, utilizing magnetization reversal and comprising the Co-based ferromagnetic metal layer formed on the base body via the metal underlying layer with surface roughness of said base body being less than 1 nm in terms of a center line average height Ra, and oxygen concentration of said metal underlying layer and said ferromagnetic metal layer being 100 wt ppm or less, by satisfying a relation $4\Pi Ms/H_k^{grain} = <1$ between the saturation magnetization Ms of the ferromagnetic metal layer and the anisotropic magnetic field $H_k^{grain}$, a high normalized coercivity ($Hc/H_k^{grain}$) of 0.35 or more can be stably obtained without depending on crystal grain diameters of the ferromagnetic metal layer.

On the other hand, it is known that crystal grain diameters of a ferromagnetic metal layer vary depending on film thickness of the ferromagnetic metal layer, and thus, it is possible to control t.Br(t=film thickness of the ferromagnetic metal layer, Br=residual magnetic flux density) by changing film thickness of the ferromagnetic metal layer and to control Hc (coercivity the ferromagnetic metal layer) by changing the film thickness of the metal underlying layer.

Accordingly, be satisfying the condition $4\Pi Ms/H_k^{grain} = <1$ of the present invention, it is possible to stably realize a high normalized coercivity ($Hc/H_k^{grain}$) of 0.35 or more at any combination of t•Br and Hc. Further, an individual magnetic head requires any combination of t•Br and Hc of a magnetic recording medium, for realizing the optimum record and reproduction characteristics. One characteristic of the magnetic recording medium of the present invention is that it sufficiently copes with this requirement of the magnetic head.

Further, in the above characteristics, by making the grain diameters of individual crystal grains constituting the ferromagnetic metal layer less than or equal to 10 nm, it is possible to improve the medium S/N by about 3 dB or more. On the other hand, when grain diameters of the crystal grains of the ferromagnetic metal layer are made smaller, surface roughness of the medium tends to be smaller, and thus, it is possible to provide a magnetic recording medium adaptable to lowering of the flying height of a head.

As described above with respect to the conventional techniques, the present inventors have already disclosed, in the international patent application PCT/JP94/01184, that a magnetic recording medium utilizing magnetization reversal has superior magnetic characteristics when oxygen concentration of the metal underlying layer and/or the ferromagnetic metal layer is 100 wt ppm or less. Film formation conditions of the ultra clean process for manufacturing such a magnetic recording medium having the metal underlying layer and/or the ferromagnetic metal layer whose oxygen concentration is 100 wt ppm or less are characteristically different form the film formation conditions of the conventional general process in the following points.

The film formation conditions of the ultra clean process relating to the present invention [film formation conditions of the conventional general process] imply that back pressure of the deposition chamber is at the level of $10^{-9}$ Torr [but possibly at the level of $10^{-7}$ Torr], and Ar gas used for film formation is uc-Ar (impurity concentration is 100 ppt or less, and preferably 10 ppt or less)[normal-Ar(impurity concentration is 1 ppm or more)]. Further, in the ultra clean process relating to the present invention, a target used in forming the metal underlying layer is preferably one whose impurity concentration is 150 ppm or less, and a target used in forming the ferromagnetic metal layer is preferably one whose impurity concentration is 30 ppm or less.

Table 1 shows conditions of manufacturing the Co-based magnetic recording medium, i.e., conditions of the ultra clean process for film formation.

TABLE 1

| Layer structure of the medium | Cr underlying layer / CoNiCr magnetic layer, Cr underlying layer/ CoCrTa magnetic layer |
|---|---|
| Method of film formation | Ultra clean process (back pressure of the deposition chamber: $3 \times 10^{-9}$ Torr or less, film deposition gas: uc-Ar gas), D.C. magnet ron sputtering |
| Substrate Body | Al substrate(with Ni-P plated layer, surface roughness: Ra<1 nm) |
| Target (at%) | 62.5Co—30Ni—7.5Cr 85.5Co—10.5Cr—4Ta 78Co—17Cr—5Ta |
| Film thickness of the magnetic layer(film thickness of the underlying layer) | 13.5 nm 16 nm 8–40 nm (2.5–100 nm) |
| Pressure of Ar gas Magnetic layer/Underlaying layer | 2/2mTorr 3/2mTorr 3/2mTorr |
| Bias applied to the substrate body Magnetic layer/Underlying layer | −300/−200 −200/0 0/0 |
| Power density | 1.2 W/cm² (Film deposition rate 1.2nm/sec.) |
| Temperature of the substrate body | 250° C. |

In the following, will be described effects of a change in film thickness of the ferromagnetic metal layer and/or metal underlaying layer on magnetic characteristics, in the Co-based magnetic recording medium formed under the ultra clean atmosphere, i.e., the magnetic recording medium utilizing magnetization reversal and having the metal underlying layer and/or ferromagnetic metal layer whose oxygen concentration is 100 wt ppm or less. A coercivity Hc, saturation magnetization Ms, residual magnetization Mr, squareness ratio S, and coercivity squareness ratio S* of the medium are acquired from a magnetization curve measured by a vibrating sample magnetometer (made by Riken Denshi Co., Ltd., BHV-50HM). Here, S and S* are defined by S=Mr/Ms and $dM/dH_{H=Hc}$=Mr/Hc(1−S*), respectively.

Figure 1:
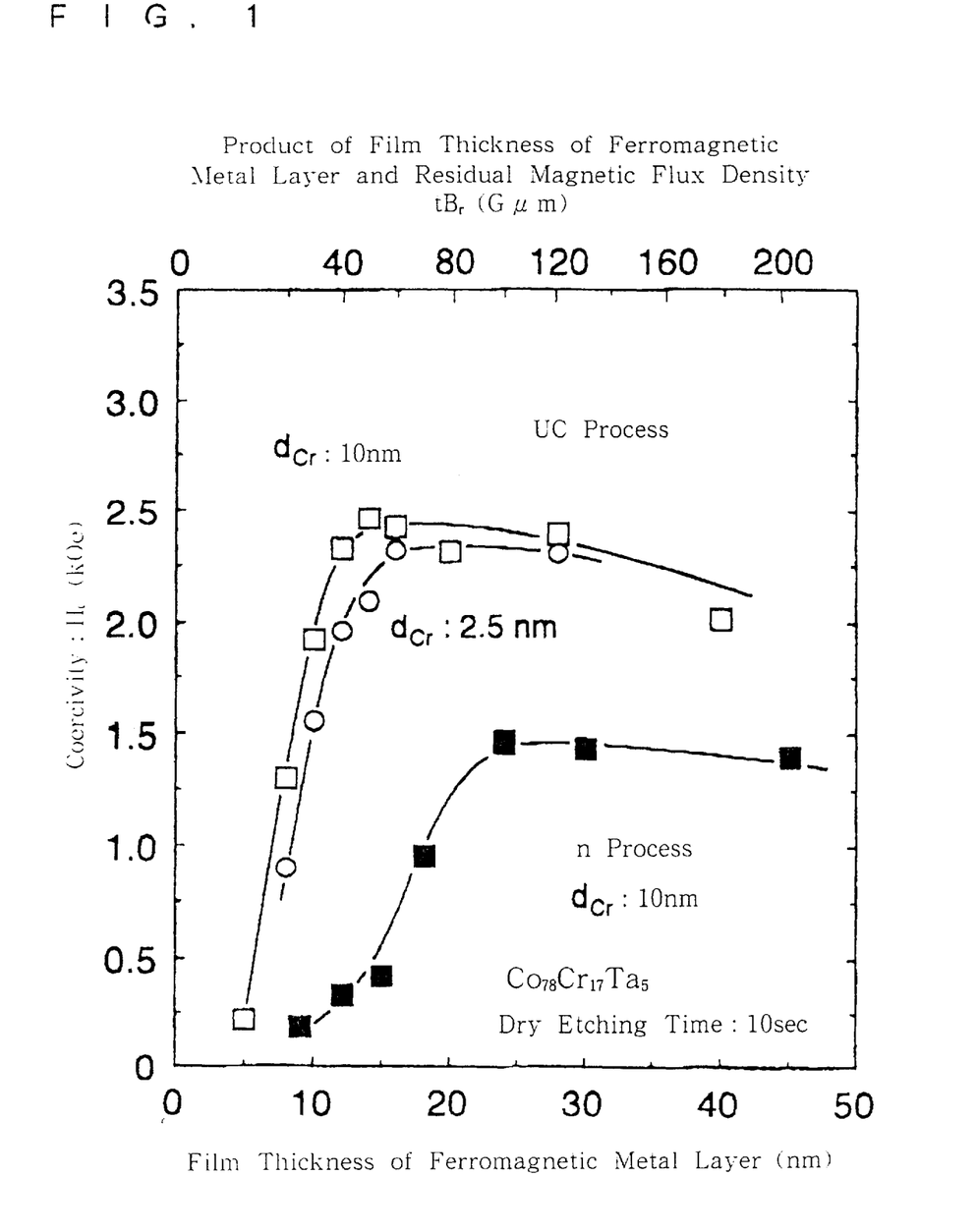
FIG. 1 is a graph showing relations between film thickness of a ferromagnetic metal layer and a coercivity, in the media manufactured by the ultra clean process and the general process.
Figure 2:
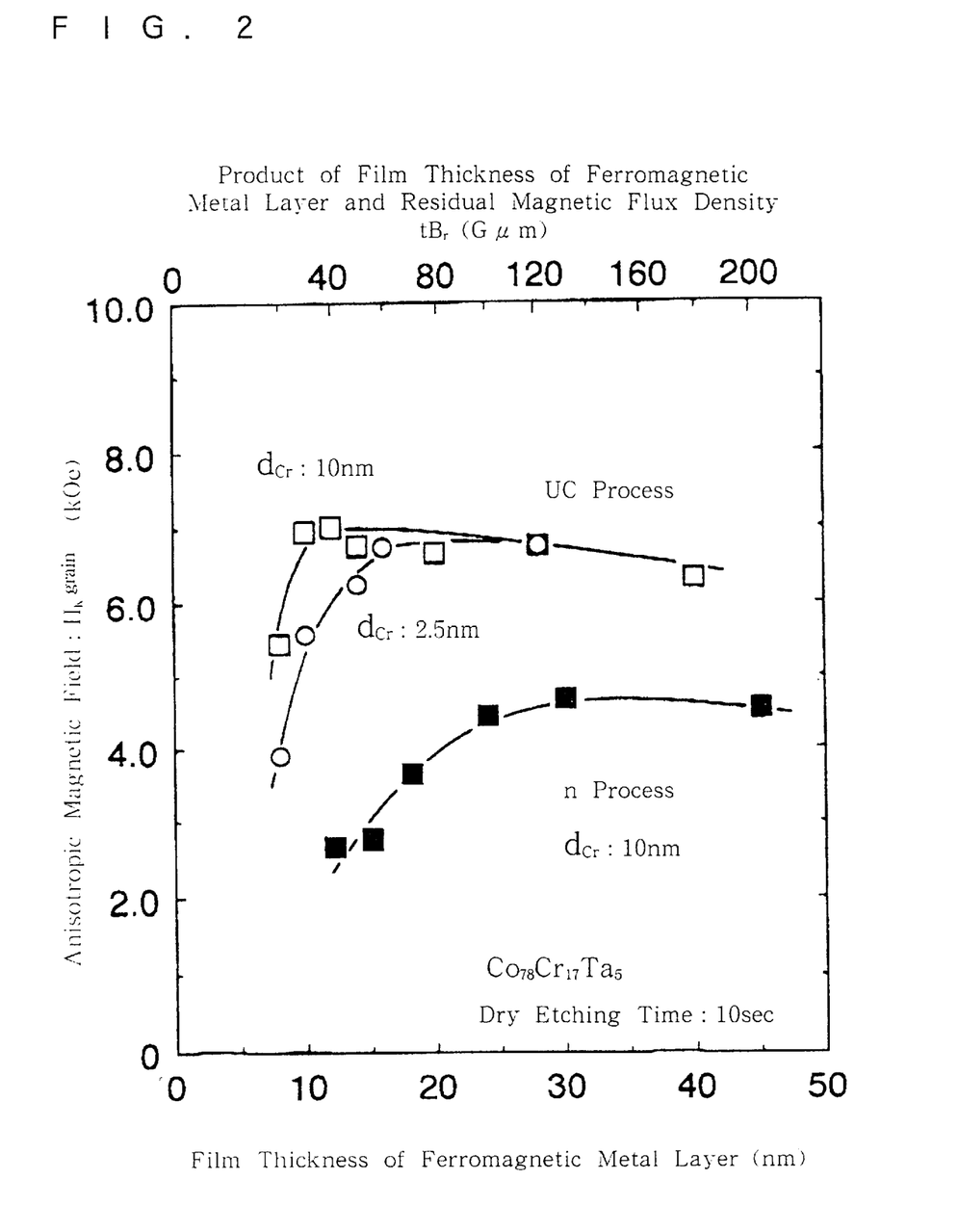
FIG. 2 is a graph showing relations between film thickness of a ferromagnetic metal layer and an anisotropic magnetic field, in the media manufactured by the ultra clean process and the general process.
Figure 3:
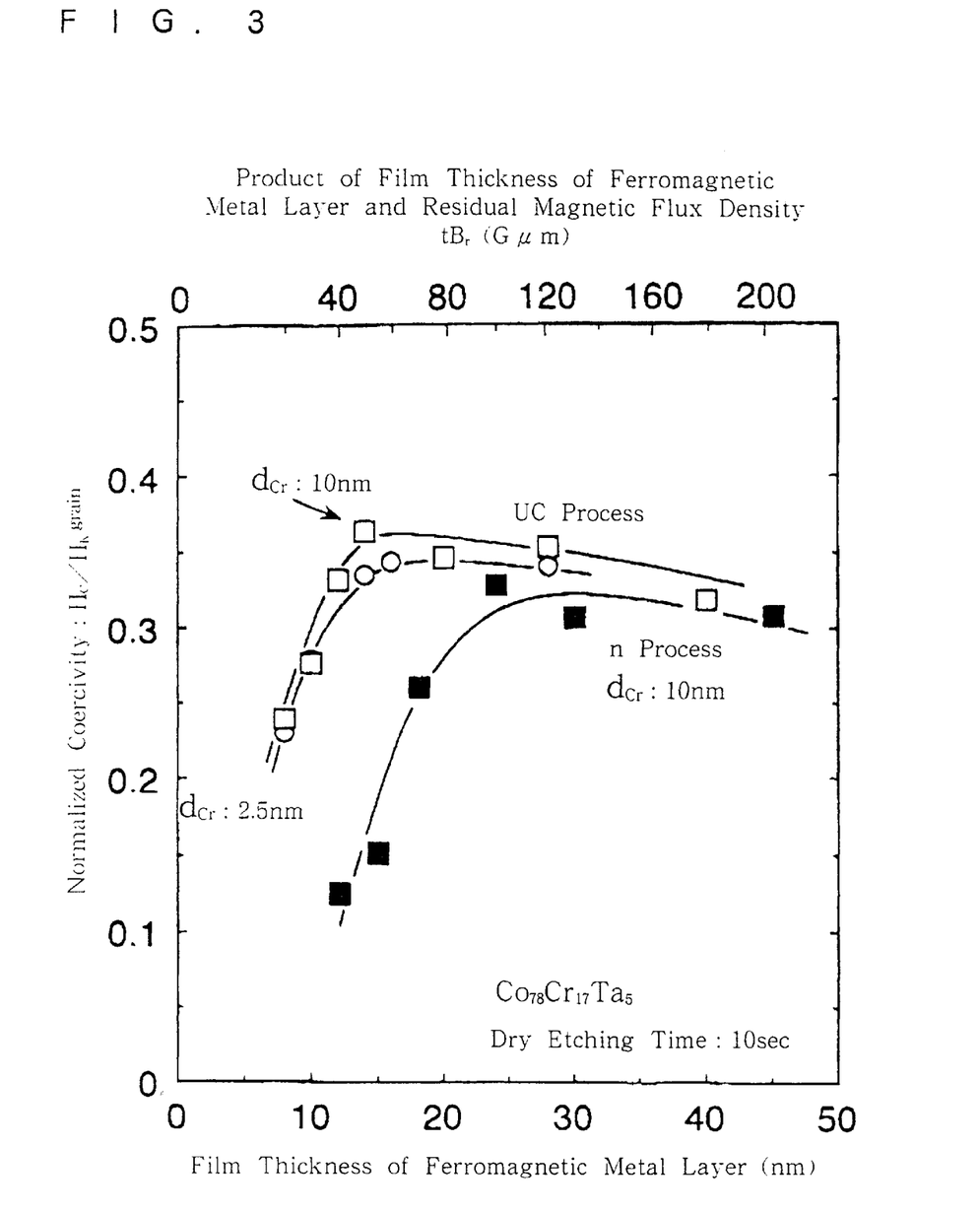
FIG. 3 is a graph showing relations between film thickness of a ferromagnetic metal layer and a normalized coercivity, in the media manufactured by the ultra clean process and the general process.

FIG. 1 is a graph showing relations between a coercivity (Hc) and film thickness of a ferromagnetic metal layer of media manufactured by the ultra clean graph showing a relation between an anisotropic magnetic field($H_k^{grain}$) of a crystal grain and film thickness of a ferromagnetic metal layer in the media manufactured by the ultra clean process of the present invention and the conventional general process. FIG. 3 shows a graph showing a relation between a normalized coercivity ($Hc/H_k^{grain}$) and a ferromagnetic metal layer in the media manufactured by the ultra clean process of the present invention and the conventional general process. For the ferromagnetic metal layer, $Co_{78}Cr_{17}Ta_5$ (at %) was used, and for the metal underlying layers, Cr was used.

From FIGS. 1–3, it is found that the medium manufactured by the ultra clean process has much higher values in its coercivity, anisotropic magnetic field, and normalize coercivity as compared to the medium manufactured by the general process, without depending on the film thickness of the ferromagnetic metal layer. Further, even when the ferromagnetic metal layer is a thin film having film thickness of 10 nm, these high coercivity, high anisotropic magnetic field, and high normalized coercivity can be maintained. Further, it is found that this tendency to obtain a high coercivity, high anisotropic magnetic field, and high normalized coercivity is realized even when the metal underlying layer is an ultra thin film having film thickness of 2.5 nm.

Figure 4:
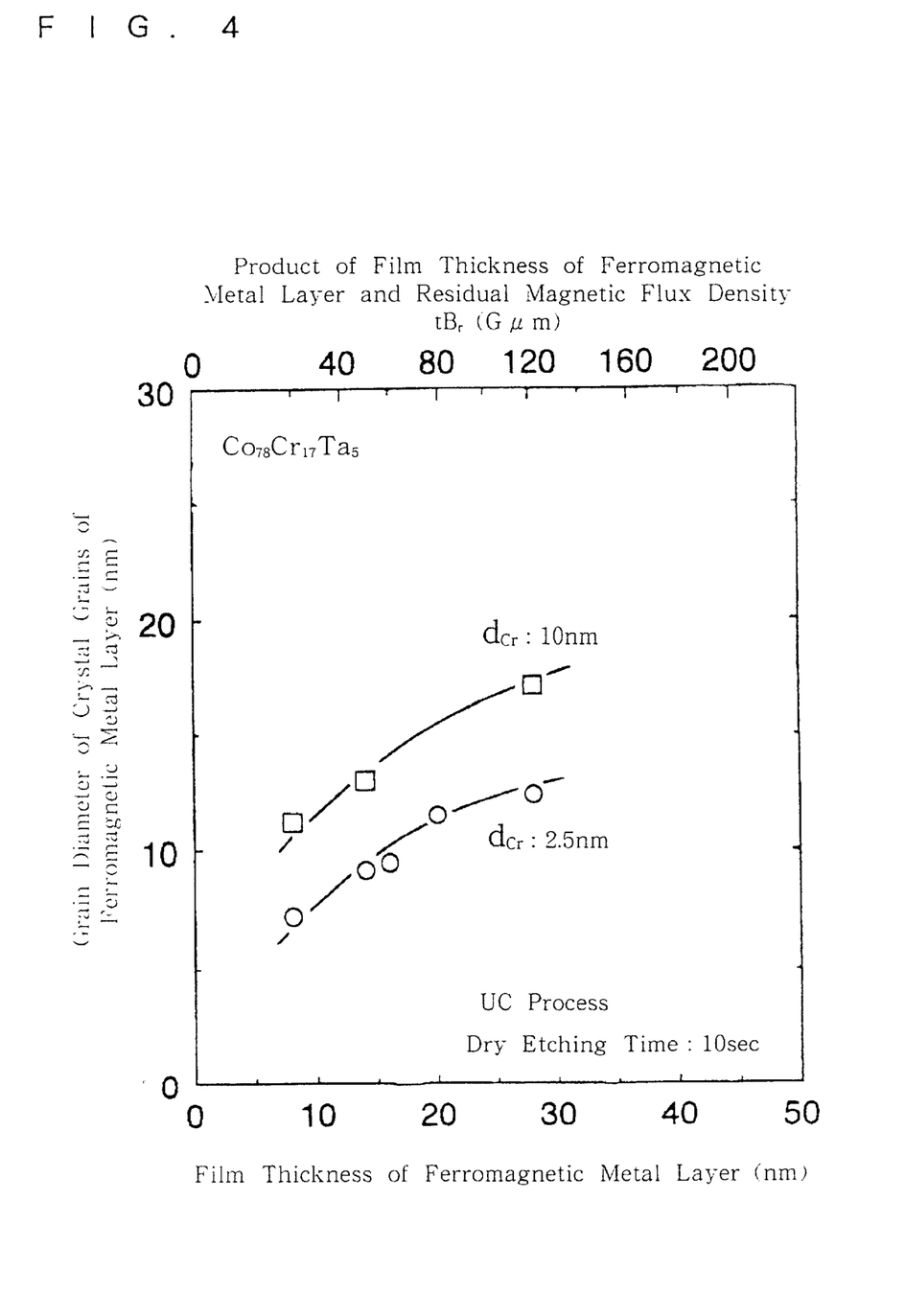
FIG. 4 is a graph showing a relation between film thickness of a ferromagnetic metal layer and a crystal grain diameter, in the media manufactured by the ultra clean process and the general process.

Further, FIG. 4 is a graph showing results of investigating a relation between a grain diameter of a crystal grain and film thickness of the ferromagnetic metal layer in the medium manufactured by the ultra clean process, shown in FIGS. 1–3. Crystal grain diameters are obtained from observation images by TEM (transmission electron microscope).

As seen from FIG. 4, in the medium manufactured by the ultra clean process, as film thickness of the ferromagnetic metal layer decreases, crystal grain diameter decreases monotonously for either film thickness of the Cr underlying layer. In particular, it is found that, in the medium whose Cr underlying layer has film thickness of 2.5 nm, when the film thickness of the ferromagnetic metal layer is reduced form 28 nm to 14 nm, the crystal grain diameter reduces form 12 nm to 9 nm.

As described above, it is found that, in the medium manufacture by the ultra clean process, even with the very thin Cr underlying layer having film thickness of 2.5 nm, film thickness of the magnetic film can be reduced while maintaining intergrandular interaction at lower level. This reduction in the magnetic film thickness, as well as reduction in the film thickness of the Cr underlying layer, is effective in reducing the crystal grain diameter of the magnetic film.

It has confirmed that the above-described tendency of the magnetic characteristics is similar when $Co_{85.5}Cr_{10.5}Ta_4$ or $Co_{62.5}Ni_{30}Cr_{7.5}$ is used as the ferromagnetic metal layer, instead of $Co_{78}Cr_{17}Ta_5$. Accordingly, it is considered as a common phenomenon to the Co-based ferromagnetic metal layers.

In the following, embodiments of the present invention will be described referring to the figures.

As the substrate body in the present invention, are listed, for example, aluminum, titanium and its alloys, silicon, glass, carbon, ceramics, plastics, and resin and its complexes. Or, there materials may be used, being subjected to a surface coating process with a non-magnetic film of different material by means of sputter technique, evaporation method, plating, or the like. It is preferable that the non-magnetic film provided on the surface of the substrate is not magnetized at high temperature, is electrically conductive, and easy to machine, and, on the other hand, has appropriate surface hardness. As a non-magnetic film satisfying such requirements, an (Ni—P) film formed by sputter technique is particularly preferable.

With regard to a shape of the substrate body, when it is to be used as a disk, a doughnut-shaped disk is employed. A substrate body provided with a below-mentioned magnetic layer etc., namely, a magnetic recording medium, is used being rotated at a speed of, for example, 3600 rpm about a center of the disk as an axis of rotation, at the time of magnetic record and reproduction. At that time, a magnetic head flies at a height of about 0.1 μm over the magnetic recording medium. Accordingly, with regard to the substrate body, surface flatness, parallelism of both top and under surfaces, waving in the circumferential direction of the substrate body, and surface toughness should be suitably controlled.

Further, when the substrate body starts or stops rotating, the surfaces of the magnetic recording medium and magnetic head contact with and slide on each other (referred to as Contact Start Stop, CSS). As a measure against this, concentric slight scratches (texture) may be provided on the surface of the substrate body.

As the metal underlaying layer in the present invention, are listed Cr and its alloys, for example. When alloy is used, combination with V, Nb, Ta, or the like is proposed. In particular, Cr is preferable, since it causes segregation action of a below-mentioned ferromagnetic metal layer. It is used frequently in mass production, and, as the method of the film formation, sputter technique, evaporation method, or the like is employed.

The role of this metal underlying layer is to promote crystal growth of the ferromagnetic metal layer in such a manner that the axis of easy magnetization of the ferromagnetic metal lies in an in-plane direction in the substrate body, or, in other words, in such a manner that a coercivity in an in-plane direction in the substrate body becomes large, when the Co-based ferromagnetic metal layer is formed on the metal underlying layer.

When the metal underlying layer comprising Cr is formed by sputter technique, as film formation factors that control its crystalline properties, are listed a surface shape, surface state of surface temperature of the substrate body, gas pressure at the time of film formation, bias applied to the substrate body, film thickness to be realized, and the like. In particular, a coercivity of the ferromagnetic metal layer tends to be higher in proportion to the film thickness of Cr, and, accordingly, the conventional film thickness of Cr is selected in the range of 50 nm–150 nm, for example.

On the other hand, the magnetic recording medium formed under the ultra clean atmosphere relating to the present invention, i.e., the magnetic recording medium utilizing magnetization reversal and having the ferromagnetic metal layer whose oxygen concentration is 100 wt ppm or less, is characterized in that the ferromagnetic metal layer has a high coercivity even when the Cr film thickness is less than 50 nm.

To prove the recording density, it is necessary to lower the flying height of the magnetic head form the surface of the medium. On the other hand, when the above-mentioned Cr film thickness is smaller, surface roughness of the medium also tends to smaller. Accordingly, it is possible to realize a magnetic recording medium that is adaptable to lowering of flying height of a head.

The ferromagnetic metal layer in the present invention is a Co-based ferromagnetic metal layer having Co as its main component. Examples of the material include CoNiCr, CoCrTa, CoCrPt, CoNiPt, CoNiCrTa, CoCrPtTa, and the like.

In the present invention, by forming the metal underlying layer and the ferromagnetic metal layer under the ultra clean atmosphere (i.e., under the above-mentioned ultra clean process) as compared with the conventional film formation conditions, the following two characteristics are obtained:

1) In the medium in which the saturation magnetization Ms and anisotropic magnetic field $H_k^{grain}$ of the ferromagnetic metal layer satisfy the relation $4\Pi Ms/H_k^{grain} =<1$, a high normalized coercivity ($Hc/H_k^{grain}$) can be obtained without depending on a crystal grain diameter of the ferromagnetic metal layer; and 2) In the medium in which, in addition to the above characteristic (1), a grain diameter of individual crystal grains constituting the ferromagnetic metal layer is 10 nm or less, it is possible to improve the medium S/N and, at the same time, surface roughness of the medium can be reduced.

Among the above-mentioned materials, favorably-used materials are CoNiCr which is inexpensive and less susceptible to the film formation atmosphere and a CoPt family, which is used to realize a coercivity of 1800 Oe or more that is difficult in the cases of CoNiCr and CoCrTa.

The magnetic recording medium in the present invention refers to a medium (in-plane magnetic recording medium) in which recording magnetization is realized in parallel with the film surface of the above-mentioned ferromagnetic metal layer. In such a medium, it is necessary to further miniaturize recording magnetization in order to improve recording density. This miniaturization reduces leakage flux of each recording magnetization, and thus reduces output of regenerative signal at the magnetic head. Accordingly, it is desired to further reduce medium noise, which is considers as effect of adjacent recording magnetization.

(Coercivity: Hc, Anisotropic Magnetic Field: $H_k^{grain}$, and Normalized Coericive Force: $Hc/H_k^{grain}$ of the Ferromagnetic Metal Layer)

In the present invention, "coercivity of the ferromagnetic metal layer: Hc" implies a coercive force of the medium, obtained form a magnetization curve which is, in turn, measured using a vibrating sample magnetometer (referred to a VSM). "Anisotropic magnetic field of a crystal grain: $H_k^{grain}$ is an applied magnetic field in which rotational hysteresis loss measured by a high sensitive torque magnetometer completely disappears. Both coercivity and anisotropic magnetic field are values measured in a plane of a thin film, in the case of the magnetic recording medium in which the ferromagnetic metal layer is formed on the surface of the substrate body via the metal underlying layer.

Further, "normalized coercivity of the ferromagnetic metal layer: $Hc/H_k^{grain}$ is a value obtained by dividing the coercivity Hc by the anisotropic magnetic field $H_k^{grain}$ of a crystal grain, expressing degree of increase in magnetic isolation of the crystal grain, which is described in "Magnetization Reversal Mechanism Evaluated by Rotational Hysteresis Loss Analysis for the Thin Film Media", Migaku Takahashi, T. Shimatsu, M. Suekane, M. Miyamura, K. Yamaguchi and H. Yamasaki: IEEE TRANSACTIONS OF MAGNETICS, VOL. 28, 1002, pp. 3285.

Normalized coercivity of the ferromagnetic metal layer formed by the conventional sputter technique is less that 0.35, as far as the ferromagnetic metal layer is Co-based. According to Stoner-Wohlfarth theory, it is shown that, when crystal grains are completely magnetically isolated, normalized coercivity becomes 0.5, and this value is the upper limit of normalized coercivity.

Further, J.-G. Zhu and H. N. Bertram: Journal of Applied Physics, VOL. 63, 1988, pp. 3248 describes that, when normalized coercivity of a ferromagnetic metal layer is higher, magnetic interaction of crystal grains becomes lower, and high coercivity can be realized.

As the sputter technique employed in the present invention, are listed, for example, a transfer type in which a thin film is formed while a substrate body is fixed in form of a target. The former is favorable for manufacturing a low cost medium owing to its mass-productivity, and the latter can be employed for manufacturing a medium superior in recording-reproducing characteristics since it is stable in incident angles of sputtered particles on a substrate body.

"Sequential forming of the metal underlying layer and the ferromagnetic metal layer" in the present invention implies "after the metal underlying layer is formed on the surface of the substrate body, it is not exposed to pressure atmosphere with higher pressure than the gas pressure at the time of film formation, before the ferromagnetic metal layer is formed on its surface." It is publicly known that, if the surface of the metal underlying layer is exposed to the atmosphere, and thereafter, the ferromagnetic metal layer is formed on it, coercivity of the medium falls remarkably (for example, no exposure: 1500 Oe→exposure: 500 Oe or less).

As "impurity in Ar gas used for film formation" in the present invention, are listed $H_2O$, $O_2$, $CO_2$, $H_2$, $N_2$, $C_xH_y$, H, C, O, CO, and the like. In particular, $H_2O$, $O_2$, $CO_2$, O, and CO are, presumedly, impurities that affect quantity of oxygen taken into the film. Accordingly, impurity concentration in the present invention is expressed by the sum of $H_2O$, $O_2$, $CO_2$, O, and CO contained in the Ar gas used for film formation.

As "cleaning process by high frequency sputtering" in the present invention, is mentioned, for example, a method in which AC voltage is applied from RF (radio frequency, 13.56 MHz) power source to a substrate body placed within a space of electrically discharge able gas pressure. This method is characterized by its applicability to a non-conductive substrate body. Generally, as an effect of the cleaning process, is mentioned improvement in adherence of a thin film to a substrate body. However, there are many ambiguities in the quality of a thin film itself formed on a substrate body. after the cleaning process.

As "impurity is a Cr target used in forming the metal underlying layer" are listed, for example, Fe, Si, Al, C, O, N, H and the like. In particular, it is conjectured that O is an impurity affecting quality of oxygen taken into the film. Accordingly, impurity concentration in the present invention refers to oxygen contained in a target used in forming the ferromagnetic metal layer.

"Application of negative bias to the substrate body" in the present invention implies that, when the Cr underlying film or the magnetic film is formed to manufacture the magnetic recording medium, DC bias voltage is applied to the substrate body. It is known that, when a suitable bias voltage is applied, coercivity of the medium is increased. It is publicly known that the above-mentioned effect of the bias application is larger when it is applied to both layers than when it is applied only in forming either of layers.

In many times, however, the above-mentioned bias application acts also on objects in the neighborhood of the substrate body, i.e., substrate body supporting members and a substrate body holder. As a result, gas or dust is generated in a space in the neighborhood of the substrate body, and taken into a thin film being formed. Thus, it tends to cause such an inconvenient state that various film characteristics become unstable.

Further, the bias application to the substrate body gives rise to the following problems, too.

1. It can not be applied to the substrate body of non-conductive material such as glass.
2. Saturation magnetic flux density (Ms) of the formed magnetic film is decreased.
3. It is required to provide a complex mechanism inside the deposition chamber.
4. Degree of bias application to a substrate body is liable to change, and thus, it tends to cause vibration in magnetic characteristics.

Thus, desired is a manufacturing method in which various film characteristics targeted can be obtained without carrying out the above-mentioned bias application.

The "ultimate degree of vacuum of the deposition chamber in which the metal underlying layer and/or the ferromagnetic metal layer is formed" in the present invention is one of the film formation factors affecting a value of coercivity for certain materials. In particular, conventionally, it has been considered that, when the above-mentioned ultimate degree of vacuum is low (For example, in the case of $5 \times 10^{-6}$ Torr or more), its effect is large in the case of ferromagnetic metal layer of Co-based material containing Ta. In the present invention, however, it is found that, also in the cases of CoNiCr and CoCrPt, i.e., Co-based materials without containing Ta, the ultimate degree of vacuum of a deposition chamber has an effect when seen form the viewpoint of whether grain boundary of amorphous structure can be formed or not between crystal grains.

The "surface temperature of the substrate body at the time of forming the metal underlying layer and/or the ferromagnetic metal layer" is one of the film formation factors affecting a value of coercivity without depending on material of the ferromagnetic metal layer. Higher coercivity can be realized when film formation is carried out at higher surface temperature as long as it does not damage the substrate body. The damage of the substrate body implies external transformations such as wrapping, swelling, cracking, and the like, and internal changes such as development of magnetization, increase of quantity of generated gas, and the like.

However, to realize high surface temperature of the substrate body, it is generally necessary to perform heat treatment in the disposition chamber or in the previous chamber. Also, this heat treatment has such inconvenient aspects that gas or dust is generated in a space in the neighborhood of the substrate body, and taken into a thin film being formed, and various film characteristics become unstable.

Further, high surface temperature of the substrate body has following problems, too.

1. Magnetization of non-magnetic NiP layer is caused in a substrate body of NiP/Al.
2. Strain is caused in the substrate body.
3. It is difficult to raise or maintain temperature of a substrate body, in the case of a substrate body having low thermal conductivity such as glass.

Accordingly, desired is a manufacturing method in which the above-mentioned heat treatment is not carried out, or various film characteristics targeted are obtained with lower heat treatment.

Surface roughness of the substrate body in the present invention refers to a center line average height Ra. As a measuring apparatus, an example is a TALYSTEP made by RANDTAYLORHOBSON Ltd.

When the substrate body starts to rotate from a stationary state or vice versa, surfaces of the magnetic recording medium and a magnetic head contact with and slide on each other (refereed to as Contact Start Stop, CSS). At that time, to suppress adhesion of the magnetic head or rise in friction coefficient, a larger Ra is favorable. On the other hand, when the substrate body arrives at the maximum rotational speed, it is necessary to ensure spacing between the magnetic recording medium and the magnetic head, i.e., the flying height of the magnetic head, and, accordingly, a smaller Ra is desirable.

Thus, the surface roughness of the substrate body and the maximum and minimum of Ra are suitably decided based on the above-described reasons and required specifications of the magnetic recording medium. For example, in the case that the flying height of the magnetic head is 2 $\mu$inch, Ra=6 nm–8 nm.

However, to realize much higher recording density, it is necessary to further reduce the flying height of the magnetic head (the distance between the magnetic head and the surface of the magnetic recording medium at the times of recording and reproduction). To satisfy this demand, it is important to flatten the surface of the magnetic recording medium furthermore. By reason of this, smaller surface roughness of the substrate body is favorable.

Thus, desired is a manufacturing method in which various film characteristics targeted are obtained even when the surface roughness of the substrate body is smaller.

As texture processing in the present invention, are listed, for example, a method using mechanical grinding, a method by chemical etching, a method of giving a physical concave and convex film, and the like. In particular, in the case of a substrate body of aluminum alloy that is used most widely, the method using mechanical grinding is employed. For example, with regard to an (Ni—P) film provided on a surface of a substrate body of aluminum alloy there is a method in which a tape to which abrasive grains for grinding are adhered is pressed against the rotating substrate body so that concentric slight scratches are given to the substrate body. In this method, the abrasive grains for grinding are sometimes used being separated from the tape.

However, because of the reasons described in the above section of "Surface roughness of the substrate body," desired is a method in which the above-mentioned texture processing is not carried out, or a method in which various film characteristics targeted are obtained with a slighter texture pattern.

As composite electrolytic polishing processing of providing an oxidized passive film by producing chromium oxide as product material on an inner wall of a vacuum chamber that is used in forming a magnetic film or the like. In the case, as the material constituting the inner wall of the vacuum chamber, preferable is, for example, SUS316L or like. This processing can reduce quantities of $O_2$ and $H_2O$ emitted form the inner wall of the vacuum chamber, and thus, it is possible to further reduce quantity of oxygen taken into the formed thin film.

The present invention has used a magnetron sputtering system (model number ILC3013: load-lock static facing type) made by Anelva Ce., Ltd., in which, the above-described processing is carried out on inner walls of all vacuum chambers (a charging/discharging chamber, a deposition chamber, and a cleaning chamber).

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

| (Symbols) | |
|---|---|
| 1. | substrate |
| 2. | Al substrate |
| 3. | non-magnetic layer |
| 4. | metal underlying layer |
| 5. | ferromagnetic metal layer |
| 6. | protective layer |
| 41. | upper magnetic pole |
| 42. | lower magnetic pole |
| 43. | writing coil |
| 44. | writing gap |
| 45. | shield |
| 46. | MR element |
| 47. | reading gap |

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

In the following, the present invention will be described referring to embodiments, although the present invention is not limited to these embodiments.

Embodiment 1

Figure 5:
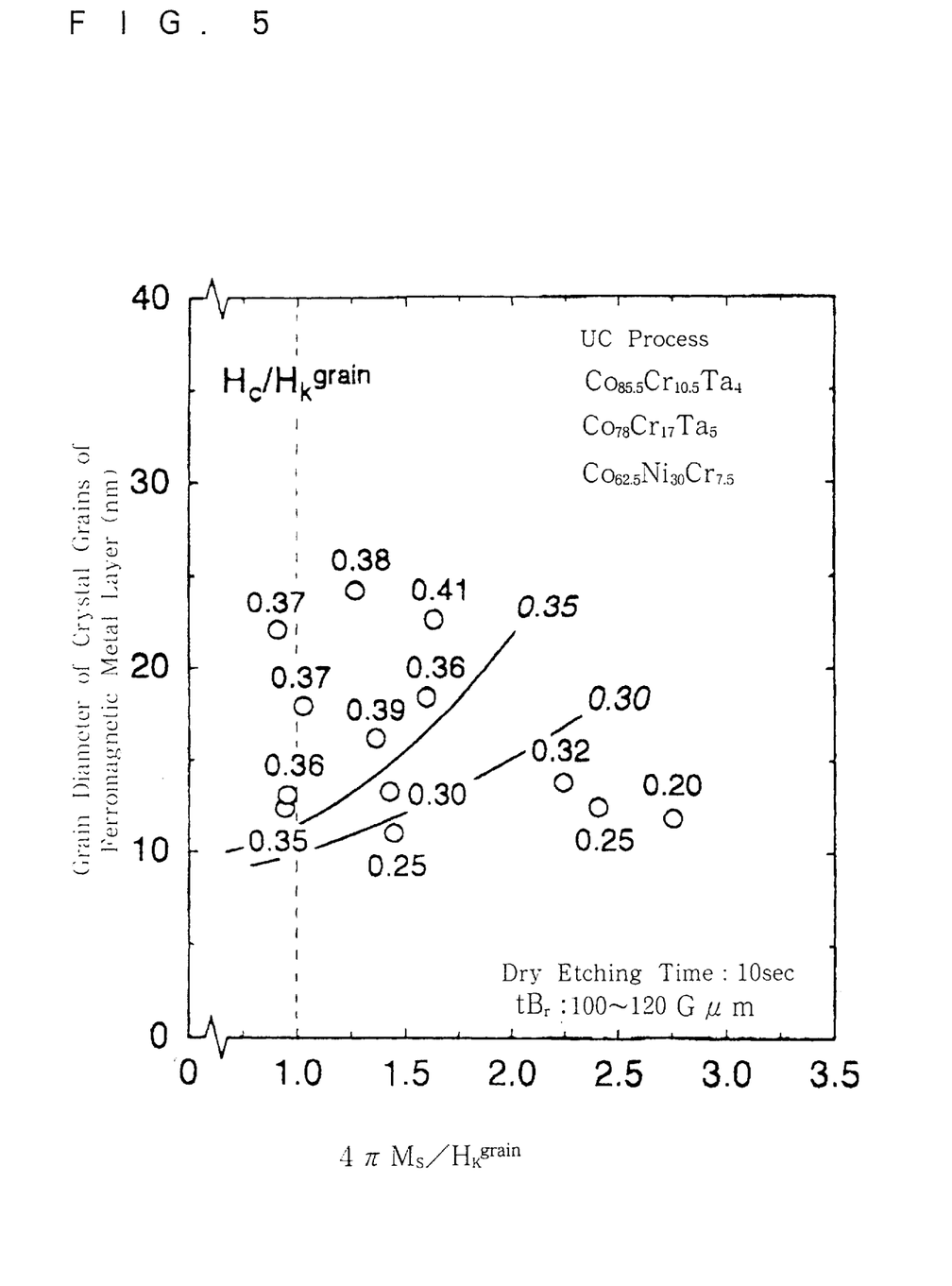
FIG. 5 is a graph showing results of investigating a value of a normalized coercivity $Hc/H_k^{grain}$ for $4\Pi Ms/H_k^{grain}$ and a crystal grain diameter of the ferromagnetic metal layer in the medium manufactured by the ultra clean process.

In the present embodiment, a value of a normalized coercivity $Hc/H_k^{grain}$ at room temperature was investigated in relation to $4\Pi Ms/H_k^{grain}$ and a crystal grain diameter of the ferromagnetic metal layer formed under the ultra clean atmosphere (by the ultra clean process), in other words, in the magnetic recording medium utilizing magnetization reversal and having the ferromagnetic metal layer whose oxygen concentration is 100 wt ppm or less. As material for the ferromagnetic metal layer, were used three compositions, i.e., $Co_{78}Cr_{17}Ta_5$, $CO_{85}Cr_{10.5}Ta_4$ and $CO_{62.5}Ni_{30}Cr_{7.5}$ (at %). Manufacturing of a medium using each ferromagnetic metal layer was carried out in accordance with the conditions shown in the above FIG. 1.

As integranular interaction in a medium comprising a Co-based ferromagnetic metal layer, two kinds, i.e., the exchange interaction and the electrostatic interaction can be considered. In a medium comprising a Co-based ferromagnetic metal layer in which the exchange interaction is reduced owing to grain boundary structure, it is conjectured that the electrostatic interaction decides the magnetic characteristics of the medium. The electrostatic interaction acting between crystal grains is caused by effect of magnetic field generated by magnetization of the neighboring crystal grains. It is considered that the magnetic field of this interaction is mainly decided by saturation magnetization Ms, crystal grain diameters, crystalline orientations, and the like of the crystal grains. By reason of this, when there is not large difference in structure of a medium, the ratio ($4\Pi Ms/H_k^{grain}$) of $4\Pi Ms$ to an anisotropic magnetic field $H_k^{grain}$ of a crystal grain can be considered as an index expressing strength of the electrostatic interaction affecting the magnetization process. Further, in a medium in which electromagnetic interaction is dominant, it is conjectured that a value of a normalized coercivity $Hc/H_k^{grain}$ as an index of the integranular interaction depends on a change of $4\Pi Ms/H_k^{grain}$. Further, it is conjectured that, in a medium comprising a Co-based ferromagnetic metal layer, magnitude of the interaction magnetic field proportional to the saturation magnetization is at the same level (the level of kOe) as the magnitude of an anisotropic magnetic field of a crystal grain, and thus it is largely affected by the electrostatic interaction.

In the present embodiment, in a medium comprising a Co-based ferromagnetic metal layer formed under the ultra clean atmosphere, i.e., magnetic recording medium utilizing magnetization reversal and having a ferromagnetic metal layer whose oxygen concentration is 100 wt ppm or less, a relation between $Hc/H_k^{grain}$ and $4\Pi Ms/H_k^{grain}$ was investigated to study the electrostatic interaction in the medium comprising the Co-based ferromagnetic metal layer.

FIG. 5 is a graph showing results of investigating a value of a normalized coercivity $Hc/H_k^{grain}$ in relation to $4\Pi Ms/H_k^{grain}$ and a crystal grain diameter of the ferromagnetic metal layer.

In FIG. 5, a value of $4\Pi Ms/H_k^{grain}$ is mainly decided by the composition of the ferromagnetic metal layer. In these media comprising the Co-based ferromagnetic metal layer, clear grain boundary structure is observed and it is conjectured that the exchange interaction is reduced.

From FIG. 5, it is found that, in the medium comprising the Co-based ferromagnetic metal layer formed under the ultra clean atmosphere, the medium having larger $4\Pi Ms/H_k^{grain}$ tends to have a lower normalized coercivity. Further, among the media having the Co-based ferromagnetic layers of the same $4\Pi Ms/H_k^{grain}$, when a crystal grain diameter reduces, a normalized coercivity tends to be lowered. In the medium in which $4\Pi Ms/H_k^{grain}$ is about 1.5, when the crystal grain diameter reduces form 23 nm to 11 nm, the normalized coercivity is largely lowered form 0.41 to 0.25. This means that the electrostatic interaction of the medium comprising the Co-based ferromagnetic metal layer depends largely on the crystal grain diameter, and increases as the crystal grain diameter reduces. On the other hand, in the medium in which $4\Pi Ms/H_k^{grain}$, is as low as 1.0 or less, it is found that, even in the medium having a small crystal grain diameter such as about 12 nm, a large normalized coercivity such as about 0.35 can be maintained. By reason of this, it is considered that, by keeping $4\Pi Ms/H_k^{grain}$ at such a low value as 1.0 or less, increase of the electrostatic interaction owing to reduction n the crystal grain diameter can be suppressed Embodiment 2

In the present embodiment regarding the medium comprising the Co-based ferromagnetic metal layer formed under the ultra clean atmosphere (by the ultra clean process), i.e., medium utilizing magnetization reversal and having the ferromagnetic metal layer whose oxygen concentration is 100 wt ppm or less, the medium was manufactured varying the film thickness of the ferromagnetic metal layer to investigate a relation between a medium S/N at the recording density of 160 kFCI and a crystal grain diameter of the ferromagnetic metal layer. As the materia of the ferromagnetic meal layer, $Co_{78}Cr_{17}Ta_5$ (at %) was used.

Figure 6:
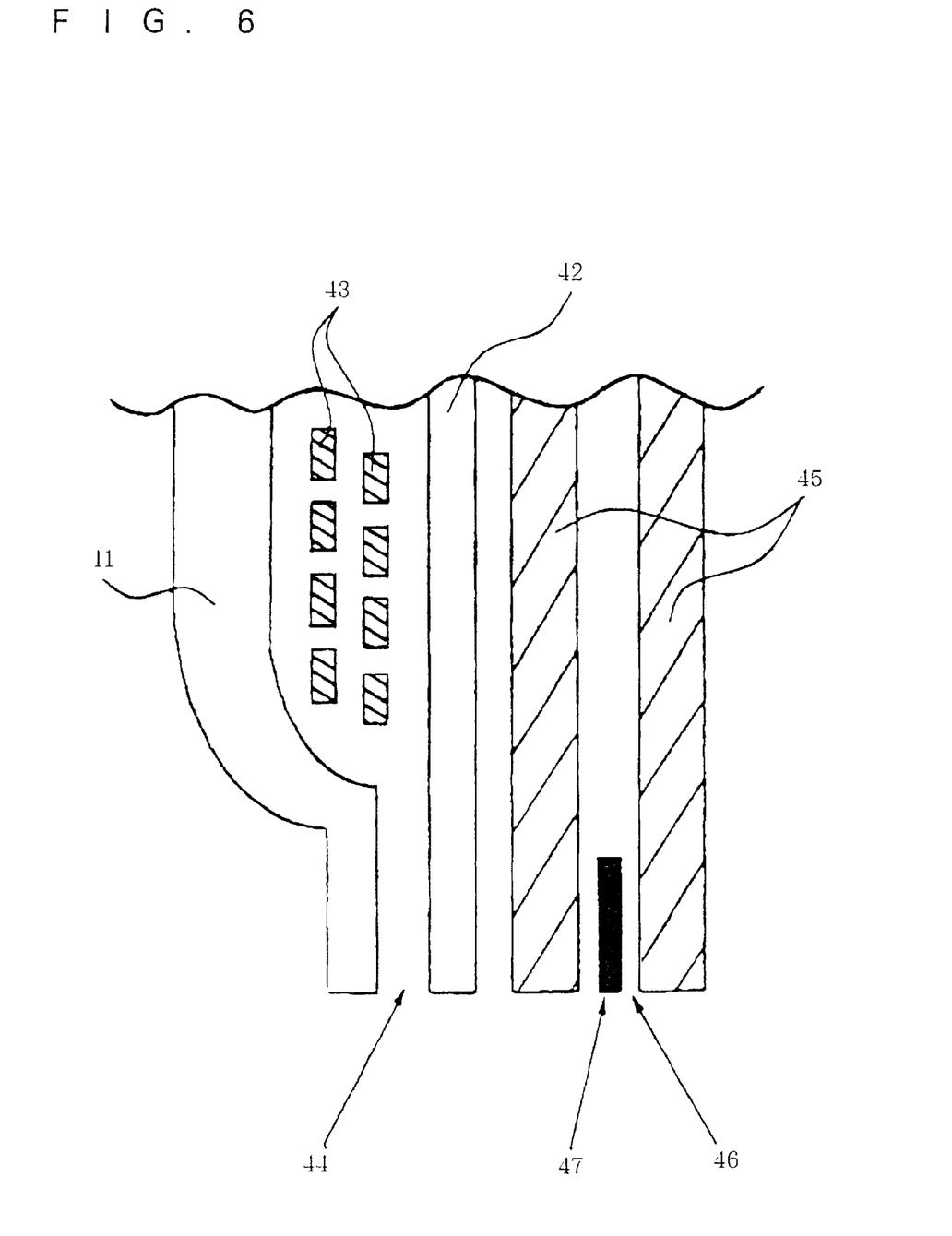
FIG. 6 is a schematic cross section showing magnetic pole structure of a writing-reading integral type thin film head used for evaluating recording-reproducing characteristics of the magnetic recording medium according to the present invention.

Recording-reproducing characteristics such as the medium S/N was measured using a writing-reading integral type thin film head (comprising an inductive head for writing and an Mr head (Magnetic Resistance Head) for reading) shown in FIG. 6 under the measurement conditions shown in Table. 2.

TABLE 2

<Magnetic head used for measuring recording-reproducing characteristics>
type of a head = writing-reading integral type thin film head
[Inductive head]

| | |
|---|---|
| writing gap length | =0.50 µm |
| core width | =3.5 µm |
| coil winding number | =14 turns |
| [Mr head] | |
| reading gap length | =0.27 µm |
| core width | =2.0 µm |
| sense current | =10 mA |

<Measurement conditions of recording-reproducing characteristics>
Peripheral velocity at disk rotation = 6.77 m/sec

| | |
|---|---|
| flying height | =70–110 nm (Including film thickness (10 nm of the protective film |
| overwrite frequency | =4.0/24.0 MHZ (30/180 kFCI) |
| writing frequency at the time | =21.3 MHZ (160 KFCI) |
| Noise band width | =40.0 MHZ |
| Resolution band Width | =300 kHz |
| $Nm = \sqrt{\{\Sigma(N_t^2 - N_{c \cdot h}^2)\}}$ | |
| :$N_t$ = total noise spectrum | |
| :$N_{c+h}$ = electrical circuit noise spectrum + head noise spectrum | |

Figure 7:
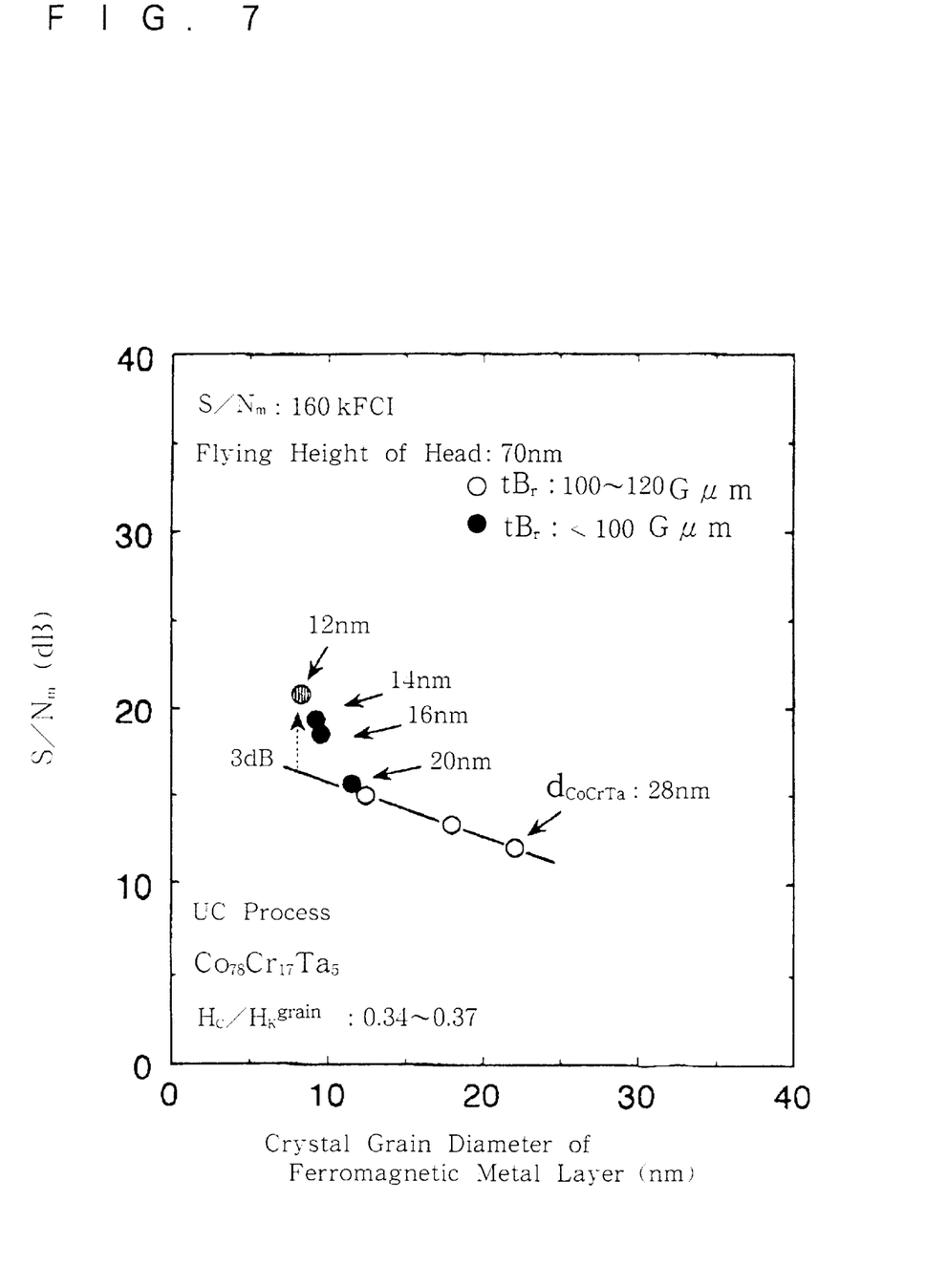
FIG. 7 is a graph showing a value of a medium S/N at a recording density of 160 kFCI, in relation to a crystal grain diameter of a ferromagnetic metal layer, in the media manufactured by the ultra clean process and having different film thickness of the ferromagnetic metal layer.

FIG. 7 is a graph showing a value of a medium S/N at recording density of 160 kFCI in relation to a crystal grain diameter of the ferromagnetic metal layer, regarding media having various film thickness of the ferromagnetic metal layer formed under the ultra clean process.

From FIG. 7, it is found that, in the medium having the ferromagnetic metal layer whose film thickness is 28 nm (mark ○), a medium S/N tends to increase as a crystal grain diameter reduces. And, it is found that, when the crystal grain diameter is 10 nm or less (mark ●, and the film thickness of the ferromagnetic metal layer is 12, 14, or 16 nm), the tenancy of the medium S/N to increase accompanying the reduction in the crystal grain diameter is larger than the medium having the ferromagnetic metal layer whose film thickness is 28 nm (mark ○). For example, it is found that, when the film thickness of the ferromagnetic metal layer is reduced to about 12 nm, the S/N ratio increases by about 3 db as compared to the medium having the ferromagnetic metal layer whose film thickness is 28 nm.

Thus, it is found that by making the crystal grain diameter of the ferromagnetic metal layer less than or equal to 10 nm, there is obtained the magnetic recording medium having a higher medium S/N than the conventional one.

A described above, according to the present invention, there is obtained a magnetic recording medium in which a coercivity, anisotropic magnetic field, and/or normalized coercivity of the ferromagnetic metal layer is high, and which is adaptable to promotion of high recording density. In particular, satisfying $4\Pi Ms/H_k^{grain} = <1$, it is possible to provide a magnetic recording medium having such a high normalized coercivity ($Hc/H_k^{grain}$) as 0.35 or more without depending on the crystal grain diameter of the ferromagnetic metal layer. Further, this high normalized coercivity ($Hc/H_k^{grain}$) can be realized in any combination of t.Br and Hc. In order that individual magnetic head realized the best recording-reproducing characteristics, a magnetic recording medium is required to have any combination of tBr and Hc. The magnetic recording medium of the present invention can sufficiently answer such request from the side of a magnetic head.

Further, in the above characteristics, by making a grain diameter of individual crystal grains constituting the ferromagnetic metal layer 10 nm or less, it is possible to further improve the medium S/N. On the other hand, when the grain diameter of crystal grains of the ferromagnetic metal layer is made small, surface roughness of the medium tends to be small, and accordingly, it is possible to provide a magnetic recording medium adaptable to lowering of flying height of a head.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A magnetic recording medium utilizing magnetization reversal, said medium comprising:
    a base body having a surface roughness of less than 1 nm in terms of a center line average high Ra; and
    a Co-based ferromagnetic metal layer formed on said base body via a metal underlying layer, with said metal underlying layer and said ferromagnetic metal layer having an oxygen concentration of 100 wt ppm or less, wherein when saturation magnetization of said ferromagnetic metal layer is expressed by Ms, and an anisotropic magnetic field of individual crystal grains constituting said ferromagnetic metal layer is expressed by $H_k^{grain}$, then, $4\Pi Ms/H_k^{grain}$ is 1 or less.

2. A magnetic recording medium according to claim 1, wherein:
    a grain diameter of the individual crystal grains constituting said ferromagnetic metal layer is 10 nm or less.

3. The magnetic recording medium according to claim 1, wherein:

said magnetic recording medium is created in an ultra clean atmosphere.

4. The magnetic recording medium according to claim 1, wherein:

said metal underlying layer having a thickness of approximately 2.5 nm or less.

5. The magnetic recording medium according to claim 1, wherein:

said magnetic recording medium having a $Hc/H_k^{grain}$ greater than or equal to 0.35 for any combination of tBr and Hc, wherein t is the film thickness for said ferromagnetic metal layer, Br is a residual magnetic flux density of the film and Hc is the coercivity of said ferromagnetic underlying layer.

6. A magnetic recording medium utilizing magnetization reversal and comprising a Co-based ferromagnetic metal layer formed on a substrate body via a metal underlying layer, with said metal underlying layer and said ferromagnetic metal layer having oxygen concentration of 100 wt ppm or less, wherein:

when saturation magnetization of said ferromagnetic metal layer is expressed by Ms, and an anisotropic magnetic field of individual crystal grains constituting said ferromagnetic metal layer is expressed by $H_k^{grain}$, then, $4\Pi Ms/H_k^{grain}$ is 1 or less.

7. A magnetic recording medium according to claim 6, wherein:

a grain diameter of the individual crystal grains constituting said ferromagnetic metal layer is 10 nm or less.

* * * * *